United States Patent [19]

Nomura

[11] 4,438,832
[45] Mar. 27, 1984

[54] SLIDE PIN DEVICE IN A FLOATING CALIPER TYPE DISC BRAKE

[75] Inventor: Yoshihisa Nomura, Toyota, Japan

[73] Assignee: Toyota Jidosha Kogyo Kabushiki Kaisha, Aichi, Japan

[21] Appl. No.: 384,344

[22] Filed: Jun. 2, 1982

Related U.S. Application Data

[63] Continuation of Ser. No. 147,940, May 8, 1980, abandoned.

[30] Foreign Application Priority Data

Jun. 9, 1979 [JP] Japan ................................. 54-72857

[51] Int. Cl.³ .............................................. F16D 65/00
[52] U.S. Cl. ............................. 188/73.45; 188/205 R
[58] Field of Search ............... 188/73.44, 73.45, 73.43, 188/73.39, 73.31, 73.32, 73.33, 73.34, 73.42, 73.47, 205, 206, 369, 72.6, 72.4, 72.5; 403/376, 377, 161, 162, 361; 411/546, 531, 368, 534, 161, 162, 163, 160, 147

[56] References Cited

U.S. PATENT DOCUMENTS

| Re. 29,582 | 3/1978 | Brown | 188/73.45 |
| 3,917,033 | 11/1975 | Rath et al. | 188/73.45 |
| 3,967,083 | 6/1976 | Bould et al. | 411/147 X |

FOREIGN PATENT DOCUMENTS

| 2520767 | 12/1975 | Fed. Rep. of Germany | 188/73.44 |
| 2548927 | 5/1976 | Fed. Rep. of Germany | 188/73.44 |
| 2915080 | 10/1979 | Fed. Rep. of Germany | 188/73.45 |
| 52-72065 | 6/1977 | Japan | 188/73.44 |
| 5132383 | 2/1979 | Japan | |

*Primary Examiner*—Douglas C. Butler
*Attorney, Agent, or Firm*—Parkhurst & Oliff

[57] ABSTRACT

An improved slide pin device for guiding a floating caliper assembly which urges a pair of braking pad assemblies onto either side of a disc rotor, while being shifted in a parallel direction to the axis of the disc rotor. The slide pin device comprises a bolt, which is screwed into a torque receiving member, at one end thereof, a sleeve of cylindrical form being pierced through by the bolt, an anti-sleeve-rotation plate, disposed between one end surface of the sleeve and the head of the bolt for being engaged with an anti-rotation-tool with the object of preventing undesirable rotation of the sleeve together with the turning of the bolt when the sleeve is fixed to the torque receiving member.

6 Claims, 9 Drawing Figures

SLIDE PIN DEVICE IN A FLOATING CALIPER TYPE DISC BRAKE

This is a continuation of application Ser. No. 147,940 filed May 8, 1980, now abandoned.

FIELD OF THE INVENTION

This invention relates to a slide pin device in a floating caliper type disc brake, and more particularly to a slide pin device used for a guide mechanism of a floating caliper assembly, wherein dust-boots are not twisted together with a sleeve and a bolt, when the slide pin device is fixed to or removed from the brake system.

BACKGROUND OF THE INVENTION

A type of disc brake system wherein a caliper assembly, which is designed to urge a pair of braking pad assemblies towards each side of disc rotor, is operated by a slide pin device mounted on a torque receiving member fixed to a stationary member and a guide hole bored in the caliper is well-known. In this type of disc brake system, the slide pin device is usually constructed such that a bolt is pierced through a sleeve and then threaded into, at one end portion thereof, a torque receiving member. In such a case, there is a tendency, when the bolt is screwed in or turned back, for the sleeve to rotate together with the bolt. The accompanying rotation of the sleeve with the bolt may cause the dust-boots disposed between the sleeve and the caliper or the torque receiving member to be twisted and sometimes damaged thereby allowing dust to adhere to the external sleeve and preventing smooth operation of the caliper mechanism.

For this reason, the sleeves have been conventionally manufactured with a flange, etc., on one end on the side of the bolt head, having a larger diameter than in the rest part thereof, for being engaged with a different tool from that for screwing up or turning back the bolt, so as to prevent the sleeve when the bolt is screwed forward or rearward from being rotated with the bolt. The way of manufacturing and the material for manufacturing the sleeve must be consequently subjected to some limited conditions, resulting, of course, in a rise in production cost.

SUMMARY OF THE INVENTION

This invention, was developed from such a background. The primary object of this invention is to provide a slide pin device used for a guide mechanism of a floating type caliper assembly at a low manufacturing cost, wherein no twisting of the dust-boots occurs when the slide pin is screwed up or turned back, eliminating the disadvantages in the prior art.

Another object of this invention is to attain the above-mentioned goals without changing the traditional way of constructing the guide mechanism.

In a guide mechanism, in accordance with this invention, a slide pin device comprises (a) a sleeve of cylindrical form for guiding said caliper assembly by the external surface thereof, (b) a bolt piercing through said sleeve and threaded into a stationary torque receiving member at one end thereof for securing said sleeve to said torque receiving member, and (c) an anti-sleeve-rotation plate of a piece of plate member, having in the center thereof a bolt piercing hole, being interposed between one end of said sleeve and a head of said bolt, and provided with at least one anti-rotation-tool engaging portion thereon. The device corresponds to a separation of a conventional integrally formed sleeve into two parts, i.e., a sleeve proper portion and a flange portion used for resisting the accompanying rotation. A simple cylindrical sleeve without a large diametered portion which is separately made from an anti-rotational piece of plate member can substitute or replace the conventional sleeve of complex structure, it is a great contribution to the reduction of the production cost without lowering the anti-rotational effect. Other parts of the brake system need not be changed.

The invention secures a stationary torque receiving member with a slide pin device that guides a caliper assembly which functions to urge a pair of braking pad assemblies disposed on either side of a disc rotor onto the disc rotor in a motion parallel to the axis of the disc rotor. The slide pin device includes a substantially cylindrical sleeve that guides the caliper assembly along its external surface and a bolt extending through the sleeve which pierces a planar member and reaches through the member until the threaded end joins with the torque receiving member. The braking action can occur when a wrench tool is engaged with the bolt connecting the planar member so that the planar member is held against rotation by the wrench tool.

DETAILED DESCRIPTION OF THE PREFERRED EMBODIMENTS

Figure 1:
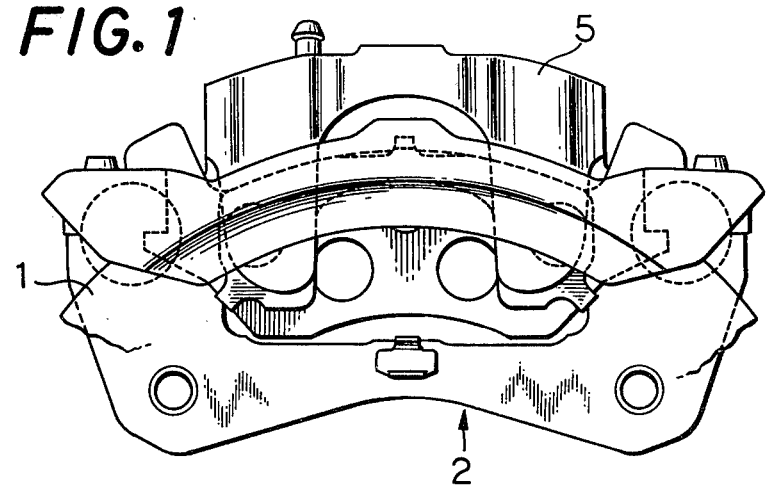
FIG. 1 is an elevational view of a disc brake including a slide pin device for a floating caliper assembly in accordance with this invention.
Figure 2:
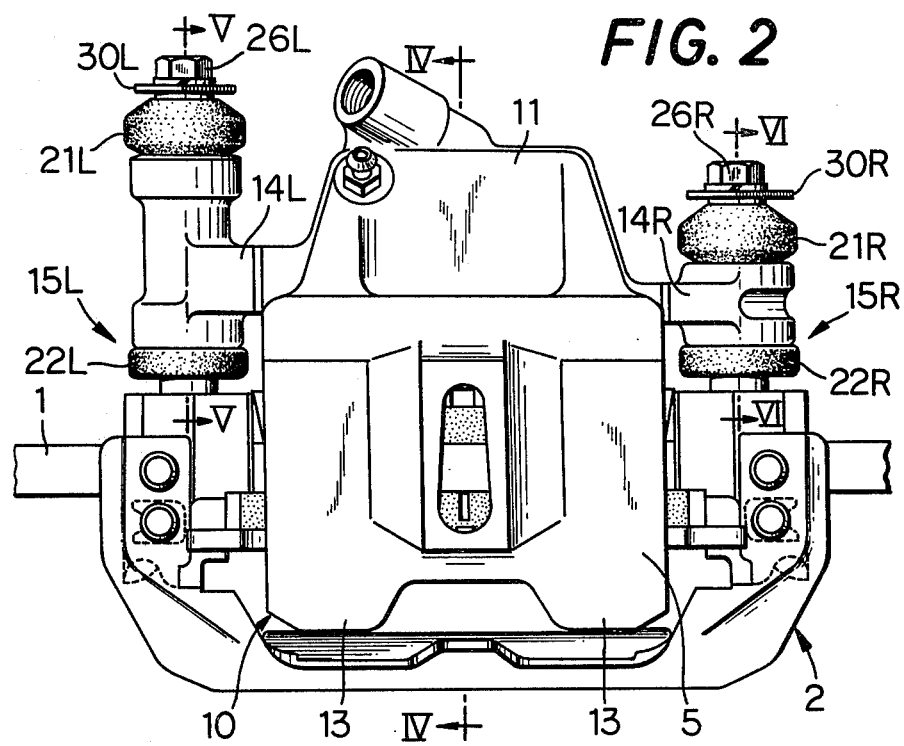
FIG. 2 is a plan view of the disc brake mentioned above.
Figure 3:
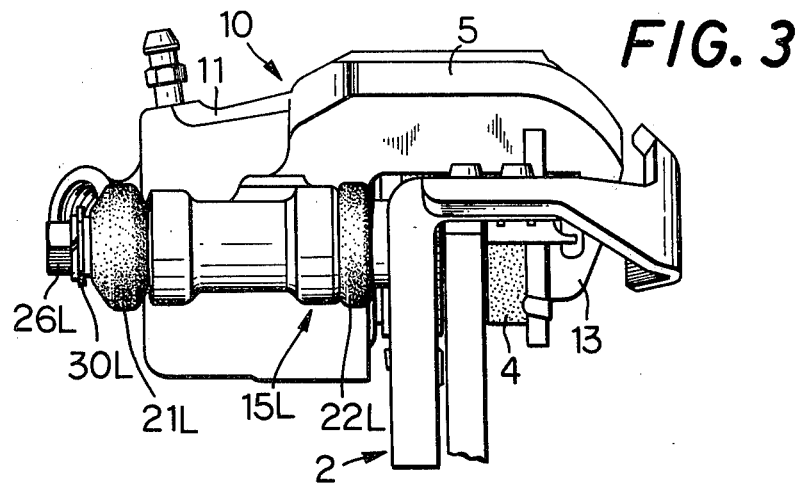
FIG. 3 is a profile of the same disc brake.
Figure 4:
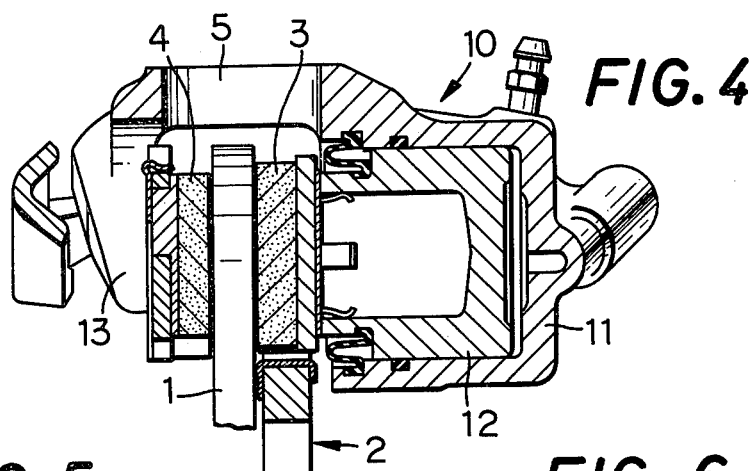
FIG. 4 is a sectional view taken along the section line IV—IV in FIG. 2.

With reference to the appended drawings, the preferred embodiments will be described hereunder.

A caliper assembly 10, shown in FIG. 1 through FIG. 4, is shiftably carried by a torque receiving member 2 attached to a stationary member in a straddling manner across a disc rotor 1 rotatable with a wheel of a vehicle.

Between a piston 12, slidably fitted into a cylinder portion 11 of a caliper 5, and the disc rotor 1 an inner pad assembly 3 is disposed, and between a reactionary portion 13, located face to face to the piston with the disc rotor 1 inbetween, and the disc rotor 1 an outer pad assembly 4. Between the torque receiving member 2 and the caliper assembly 10 a pair of guide mechanisms 15L and 15R are installed.

Figure 5:
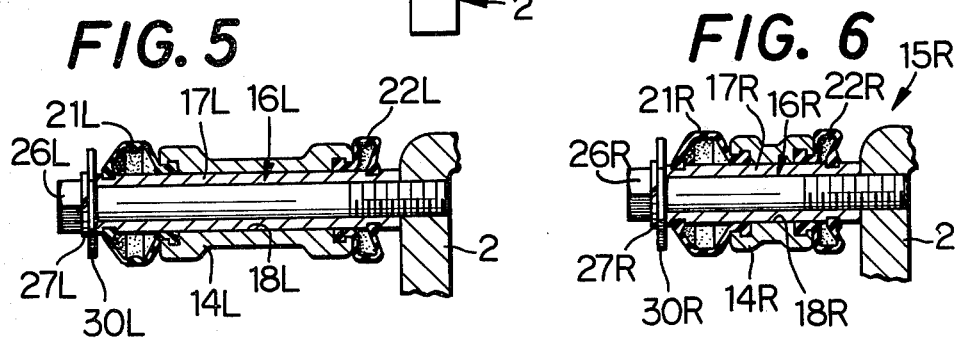
FIG. 5 is a sectional view taken along the section line V—V in FIG. 2 (an embodiment of this invention)
Figure 6:
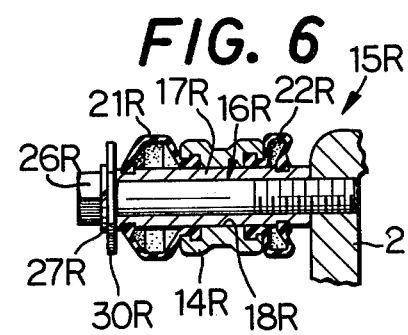
FIG. 6 is a sectional view taken along the section line VI—VI in FIG. 2 (an embodiment of this invention)
Figure 7:
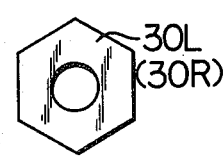
FIG. 7 is an elevational view of an anti-rotation plate used in the slide pin device in examples shown in FIG. 5 and FIG. 6.

The guide mechanisms 15L and 15R in this case are not, in general, different from the conventional ones, having the undermentioned structure: they are, as shown in FIGS. 5 and 6, at one end portion thereof fixed to the torque receiving member 2 in a standing posture; a pair of bolts 16L and 16R, a long and a short which are perpendicularly fitted into the side surface of the torque receiving member 2, are guided by sleeves 17L and 17R respectively; on either arm 14L and 14R of the caliper 5 each guide hole or a through hole 18L and 18R are bored; and two pairs of dust-boots 21L & 22L and 21R & 22R are respectively disposed in engagement with, at their respective end portion, the sleeves 17L & 17R and the caliper arms 14L and 14R.

It is important to note that the sleeves 14L and 14R are of cylindrical form, with different lengths, and that a washer 27L, 27R and anti-sleeve-rotation plates 30L, 30R (hereinafter called anti-rotation plates) of hexagonal form have a central through hole for passage of bolts 16L and 16R. The plates are interposed between one end of the sleeve (left side end in FIGS. 5 and 6) 14L, 14R and each head of the bolts 26L, 26R. Both anti-rotation plates 30L and 30R are of the same shape. And in this embodiment the slide pin device is composed of the bolt 16L (16R), the sleeve 17L (17R), the washer 27L (27R), and the anti-rotation plate 30L (30R).

When the caliper assembly 10 is mounted on the torque receiving member 2, in this embodiment, each one end of the dust-boots 21L, 22L and 21R, 22R is engaged at first with an engaging groove of the guide hole 18L, 18R before the sleeves 17L, 17R are respectively inserted into the guide holes 18L, 18R and the other end of the dust-boots 21L, 22L and 21R, 22R are respectively engaged with an annular groove formed on the external surface of the sleeves 17L, 17R. Then the bolts 16L, 16R are respectively inserted into the through holes of the sleeves 17L, 17R, with the anti-rotation plates 30L, 30R and the washers 27L, 27R pierced through to the root of the bolts 16L, 16R beforehand. A spanner or some other tool is engaged with the head 26L, 26R of the bolts 16L, 16R to rotate or screw them up firmly. This rotation or screwing is carried out while the anti-rotation plates 30L, 30R are being engaged with another spanner or suitable tool to prevent an accompanying rotation of sleeves 17L and 17R. Such rotation is prevented because the sleeves 17L and 17R are urged against torque receiving member 2 by anti-rotation plates 30L and 30R respectively and not by rotating heads 26L and 26R.

In other words, the relative rotation which takes place when the bolts 16L, 16R are screwed to the torque receiving member 2 is seen only between the bolt heads 26L, 26R and the anti-rotation plates 30L, 30R. There is no relative rotation seen between the anti-rotation plates 30L, 30R and the sleeves 17L, 17R, so the latter cannot be rotated accompanied by the rotation of the bolts 16L, 16R. And the anti-rotation plates 30L, 30R can be manufactured easily in a press method, which is a great simplification of the production process in comparison to the conventional way of manufacturing, wherein a sleeve provided with an anti-rotation portion integrally formed has been needed. For that purpose, cold forging or some other method is necessitated and the material is also required to be suitable for the manufacturing process of high grade. It can be said that this invention contributes a great deal to the lowering of the production cost. In short, a conventional sleeve having an anti-rotation flange integrally formed has been divided into two separate parts, i.e., the sleeves 17L, 17R and the anti-rotation plates 30L, 30R. So the structure and shape of the rest members of the guide mechanism 15L, 15R does not need to be changed at all.

Figure 8:
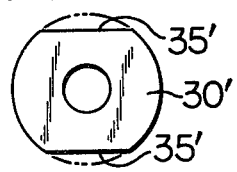
FIGS. 8 and 9 are respectively an elevational view of different example of the anti-rotation plate.
Figure 9:
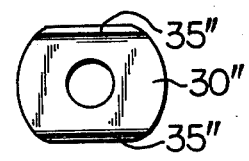

The anti-rotation plate is not limited to the above-mentioned shape, but it may be of shape shown in FIG. 8 as 30' wherein a pair of diametrically separated portions on a circular plate member are cut off by a pair of strings running at equally distant points parallelly to each other. Instead of cutting off the above-mentioned diametrically separated portions may be merely bent in a same direction to make an anti-rotation plate designated with 30" in FIG. 9. The bent portions may extend uprightly in the identical direction from parallel lines spaced at equal distances from the center of the circular plate. In the above-mentioned two cases an anti-rotation tool can be engaged therewith at the straight lined edge 35' of the anti-rotation plate 30' or at the outer surface of the bent portion 35" of the anti-rotation plate 30" uprightly bent, for preventing the accompanying or forced rotation of the sleeve. A slide pin device for guiding a caliper assembly connected to a pair of braking pad assemblies could be one embodiment of the anti-rotational tool. In such an embodiment, the braking pad assemblies would be disposed on either side of a disc rotor with the slide pin device urging the braking pad assemblies in a movement parallel to the axis of the disc rotor. The slide pin device could comprise a substantially cylindrical sleeve for guiding the caliper assembly, with a bolt extending through the cylindrical sleeve and threaded into a stationary torque receiving member and thereby securing the sleeve to the torque receiving member and a hexagonal plate which prevents the rotation of the sleeve about the axis of the bolt upon rotation of the disc rotor. This hexagonal plate would be apart from the sleeve. At the center of the plate, a bolt hole would extend through the hexagonal plate connecting the sleeve and the head of the bolt. The hexagonal plate could be manually held against rotation by a tool that tightens the bolt and thereby engaging one of the pairs of braking pad assemblies.

It goes without saying that this invention can be modified or varied in many ways without departing from the spirit and scope of the invention.

What is claimed is:

1. A slide pin device for guiding a caliper assembly which functions to urge a pair of braking pad assemblies, disposed on either side of a disc rotor, onto said disc rotor, in a movement thereof parallel to the axis of said disc rotor, said slide pin device comprising:
   a substantially cylindrical sleeve for guiding said caliper assembly along its external surface;
   a bolt extending through said sleeve and threaded into a stationary torque receiving member at one end thereof for securing said sleeve to said torque receiving member; and
   a generally planar member separate from said sleeve and having in the center thereof a bolt hole extending therethrough, said planar member being interposed between one end of said sleeve and the head of said bolt for preventing rotation of said sleeve about axis of said bolt upon rotation thereof, said planar member having means engageable with a tool for manually holding said planar member against rotation upon rotation of said bolt.

2. A slide pin device in accordance with claim 1, wherein said planar member is a plate of hexagonal form, each pair of opposite sides of the hexagonal plate constituting said means.

3. A slide pin device in accordance with claim 1, wherein said planar member has a pair of opposite arcuate sides along a pair of diametrically opposite arcs of a circle, and a pair of opposite straight sides extending along parallel lines spaced at equal distances from the center of said circle such that said straight sides cooperate with said arcuate sides to form a periphery of said planar member, said pair of opposite straight sides constituting said means.

4. A slide pin device in accordance with claim 1, wherein said planar member is a circular plate having a pair of diametrically opposite bent portions extending uprightly in the identical direction from parallel lines spaced at equal distances from the center of the plate, said opposite bent portions constituting said means.

5. A slide pin device for guiding a caliper assembly which functions to urge a pair of braking pad assemblies, disposed on either side of a disc rotor, onto said disc rotor, in a movement thereof parallel to the axis of said disc rotor, said slide pin device comprising:
   a substantially cylindrical sleeve for guiding said caliper assembly along its external surface;
   a bolt extending through said sleeve and threaded into a stationary torque receiving member at one end thereof for securing said sleeve to said torque receiving member; and
   a hexagonal plate for preventing rotation of said sleeve about the axis of said bolt upon rotation thereof, said plate being separate from said sleeve and having in the center thereof a bolt hole extending therethrough, said hexagonal plate being interposed between one end of said sleeve and the head of said bolt, said hexagonal plate being manually held against rotation, upon rotation of said bolt, by a tool engaging one of the pairs of opposite arcuate sides of said plate.

6. A method of securing to a stationary torque receiving member a slide pin device for guiding a caliper assembly which functions to urge a pair of braking pad assemblies, disposed on either side of a disc rotor, onto said disc rotor, in a movement thereof parallel to the axis of said disc rotor, said slide pin device including a substantially cylindrical sleeve for guiding said caliper assembly along its external surface and a bolt extending through said sleeve, said method comprising the steps of:
   inserting said sleeve into a guide hole formed in an arm of said caliper assembly;
   piercing said bolt into a central bolt hole in a generally planar member and inserting said bolt into a throughhole in said sleeve until the threaded end reaches said torque receiving member;
   putting a wrench tool into engagement with a tool engaging portion of said planar member, and holding said wrench tool; and
   threading said bolt into said torque receiving member while said planar member is held against rotation by the wrench tool.

* * * * *